(12) United States Patent
Kim

(10) Patent No.: US 8,516,278 B2
(45) Date of Patent: Aug. 20, 2013

(54) POWER CONSUMPTION CONTROL METHOD AND APPARATUS FOR A PORTABLE TERMINAL

(75) Inventor: Hyung Gon Kim, Daegu (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 329 days.

(21) Appl. No.: 12/925,443

(22) Filed: Oct. 21, 2010

(65) Prior Publication Data

US 2011/0089926 A1  Apr. 21, 2011

(30) Foreign Application Priority Data

Oct. 21, 2009  (KR) .................. 10-2009-0100166

(51) Int. Cl.
*G06F 1/00*   (2006.01)
*G06F 1/26*   (2006.01)

(52) U.S. Cl.
USPC ........... 713/300; 713/320; 713/323; 713/324; 331/157; 323/293; 455/567

(58) Field of Classification Search
USPC ................... 713/300–324; 323/293
See application file for complete search history.

(56) References Cited

U.S. PATENT DOCUMENTS

| | | | |
|---|---|---|---|
| 5,202,647 A * | 4/1993 | Muraki et al. ................. | 331/74 |
| 5,333,176 A * | 7/1994 | Burke et al. ................... | 455/557 |
| 6,617,933 B2 * | 9/2003 | Ito et al. .......................... | 331/25 |
| 6,903,593 B2 * | 6/2005 | Wang ............................. | 327/307 |
| 6,940,353 B2 * | 9/2005 | Moraveji ...................... | 330/264 |
| 7,158,811 B2 * | 1/2007 | Jin ................................. | 455/557 |
| 7,279,998 B2 * | 10/2007 | Matsuura ................ | 331/116 FE |
| 7,529,211 B2 * | 5/2009 | Narasimha et al. ........... | 370/337 |
| 7,983,328 B2 * | 7/2011 | Fukuda ......................... | 375/219 |
| 7,986,194 B2 * | 7/2011 | Kiyohara et al. ............. | 331/158 |
| 8,004,363 B2 * | 8/2011 | Kawashima et al. ......... | 330/293 |
| 8,041,972 B2 * | 10/2011 | Jarosinski et al. ............ | 713/323 |
| 8,183,919 B2 * | 5/2012 | Song et al. ..................... | 330/253 |
| 8,254,598 B2 * | 8/2012 | Holzmann ..................... | 381/111 |
| 2003/0020556 A1 * | 1/2003 | Kubo et al. .................... | 331/158 |
| 2006/0017517 A1 * | 1/2006 | Ootsuka et al. ............... | 331/158 |
| 2008/0198795 A1 * | 8/2008 | Kim et al. ..................... | 370/328 |
| 2009/0054075 A1 * | 2/2009 | Boejer et al. ............... | 455/456.1 |
| 2010/0013778 A1 * | 1/2010 | Liu et al. ....................... | 345/173 |
| 2011/0089926 A1 * | 4/2011 | Kim .............................. | 323/293 |

OTHER PUBLICATIONS

Fairchild Semiconductor—"NC7SV04—TinyLogic ULP-A Inverter"; Dated Nov. 2010, 11 pages.*

* cited by examiner

*Primary Examiner* — Brian Misiura

(57) ABSTRACT

A method and apparatus control power consumption in a portable terminal by cutting the direct current (DC) bias voltage. The power consumption control apparatus of a portable terminal is connected to the processors. The apparatus includes an oscillator, an inverter, and a DC bias voltage cutting unit. The oscillator creates signals to control the portable terminal to be operated in a sleep mode or a standby mode. The inverter receives the signals from the oscillator and outputs inverted signals to the processors. The DC bias voltage cutting unit cuts a DC bias voltage that is derived on a feedback line between an input port and an output port of the inverter, from the signals created by the oscillator. The apparatus and method can allow the portable terminal to reduce the power consumption when the processors are driven.

21 Claims, 4 Drawing Sheets

POWER CONSUMPTION CONTROL METHOD AND APPARATUS FOR A PORTABLE TERMINAL

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Oct. 21, 2009 and assigned Serial No. 10-2009-0100166, the entire disclosure of which is hereby incorporated by reference.

TECHNICAL FIELD OF THE INVENTION

The present invention relates to portable terminals and, more particularly, to a method and apparatus that control power consumption in a portable terminal.

BACKGROUND OF THE INVENTION

In recent years, portable terminals have been widely used because they can be easily carried and provide a variety of functions including a voice call function. Portable terminals are now serving as multimedia communication systems because they can provide data transmissions services and other various additional services.

Portable terminals each include a processor for executing a general application and circuitry for driving the processor. The circuitry includes an inverter for inverting an input signal. The inverter is connected with a feedback resistor for stabilizing a circuit. When the inverter feeds its output back to the input terminal, a direct current (DC) bias voltage is derived to the line connected to the feedback resistor. The DC bias voltage increases the magnitude of the voltage output from the inverter. This causes the portable terminal to increase the power consumption. In particular, this phenomenon increases the power consumption of the battery even when the portable terminal is operating in sleep mode, thereby causing the rapid depletion of the battery power.

SUMMARY OF THE INVENTION

To address the above-discussed deficiencies of the prior art, it is a primary object to provide a method and apparatus for controlling power consumption that can cut the DC bias voltage in the portable terminal and reduce the power consumption.

In accordance with an embodiment of the present invention, the present invention provides a power consumption control apparatus of a portable terminal including: an oscillator, an inverter and a DC bias voltage cutting unit. The oscillator creates signals to control the portable terminal to be operated in a sleep mode or a standby mode. The inverter receives the signals from the oscillator and outputs inverted signals to the processors. The DC bias voltage cutting unit cuts a DC bias voltage that is derived on a feedback line between an input port and an output port of the inverter, from the signals created by the oscillator.

In accordance with another embodiment of the present invention, the present invention provides a power consumption control method of a portable terminal. The method includes creating signals to control the portable terminal to be operated in a sleep mode or a standby mode. The signals from the oscillator are inverted and fed back to a feedback line. A DC bias voltage that is derived, on the feedback line, is cut from the signals created by the oscillator.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. Hereinafter, embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

In an embodiment of the present invention, the portable terminal can be applied to all types of terminals that execute applications. That is, the portable terminal can also be applied to all information communication devices, multimedia devices, and their applications, such as a mobile communication terminal, a Portable Multimedia Player (PMP), a Personal Digital Assistant (PDA), a smart phone, an MP3 player, and such.

In an embodiment of the present invention, the applications refer to all application programs that can be executed in the portable terminal, for example, a program for executing an MP3 player function, a program for executing a multimedia player function, a program for operating a camera function, a game executing program, a program for executing a wireless internet function, and such.

In an embodiment of the present invention, although the portable terminal includes a multi-chip where a main processor and an application processor are individually configured, it should be understood that the present invention is not limited to the embodiment. For example, the portable terminal can also be implemented to include a single chip.

In an embodiment of the present invention, the power consumption control apparatus is configured as an apparatus for driving processors.

Figure 1:
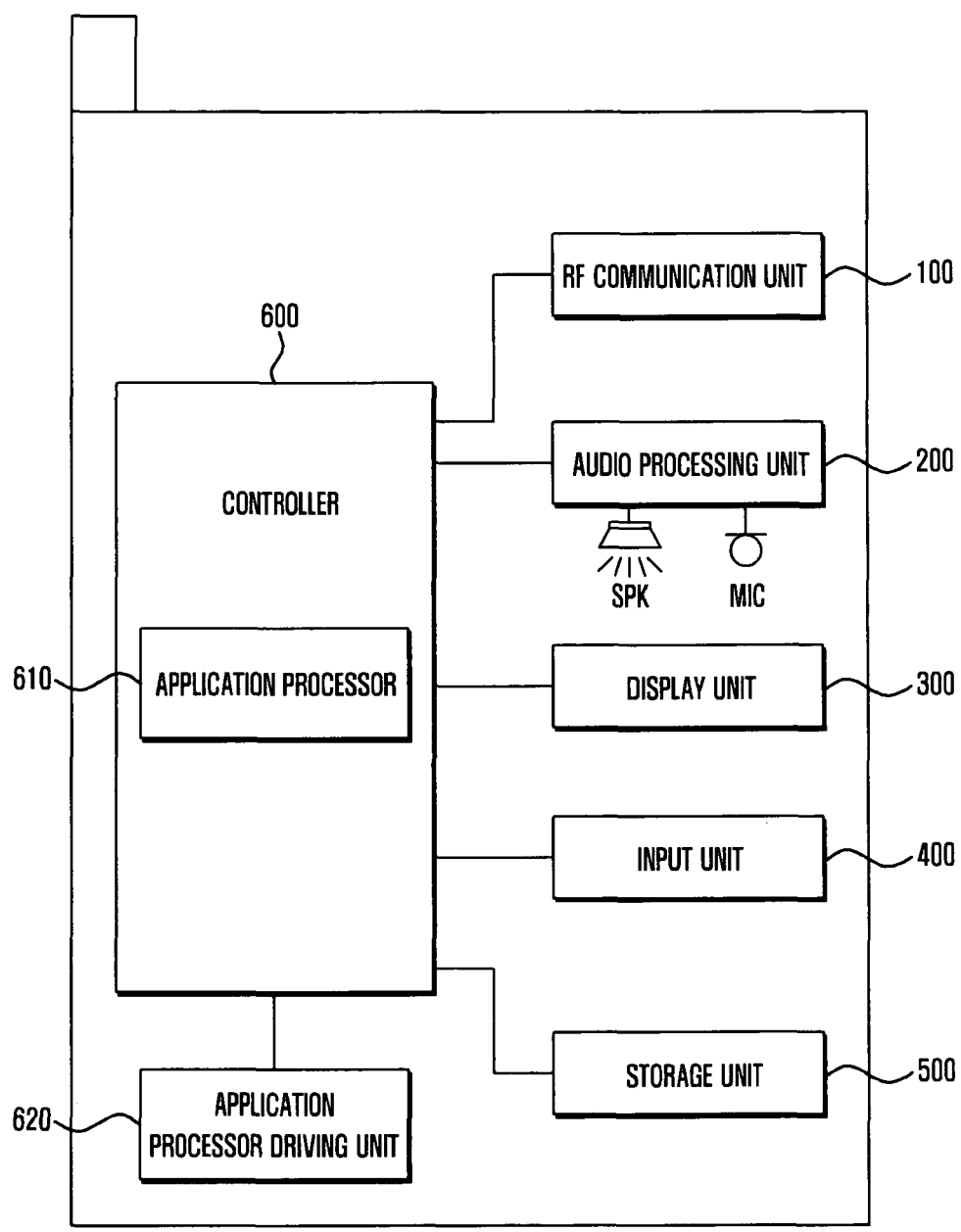
FIG. 1 illustrates a portable terminal with a processor driving apparatus according to an embodiment of the present invention.

FIG. 1 illustrates a portable terminal with a processor driving apparatus according to an embodiment of the present invention. As shown in FIG. 1, the portable terminal includes an RF communication unit 100, an audio processing unit 200, a display panel 300, an input unit 400, a storage unit 500, a controller 600, and an application processor driving unit 620.

The RF communication unit 100 performs RF communication to transmit and receive data to and from other external systems. The RF communication unit 100 includes an RF transmitter for up-converting the frequency of signals to be transmitted and amplifying the signals and an RF receiver for low-noise amplifying received RF signals and down-converting the frequency of the received RF signals. The RF communication unit 100 receives data via an RF channel and outputs it to the controller 600. The RF communication unit 100 also transmits data output from the controller 600 via the RF channel.

The audio processing unit 200 may be configured to include a codec (coder & decoder). The codec includes a data codec for processing packet data and an audio codec for processing audio signals, such as a voice signal. The audio processing unit 200 converts a digital audio signal into an analog audio signal to play it back through a speaker (SPK) using the audio codec. The audio processing unit 200 also converts an analog audio signal, received by a microphone MIC, into a digital audio signal using the audio codec.

The display panel 300 may be implemented with a liquid crystal display (LCD). The display panel 300 displays menus of the portable terminal, data input by a user, function option information, additional information, and such. For example, the display panel 300 displays a booting screen, an idle screen, a call screen, and other screens for executing applications.

The input unit 400 receives user input for controlling the portable terminal. The input unit 400 may be configured with a 3×4 keypad, a QWERTY keypad, a touch pad, and such, which include numerical keys, alphabetical keys, and directional keys, respectively.

The storage unit 500 stores data and programs required to operate the portable terminal. The storage unit 500 is divided into a program storage area and a data storage area. The storage unit 500 is implemented with volatile storage media or non-volatile storage media or a combination thereof. The volatile storage media includes semiconductor memory, such as RAM, DRAM, SRAM, and such. The non-volatile storage media includes a hard disk. In an embodiment of the present invention, the storage unit 500 stores at least one application in the program storage area. In particular, if the application operates an MP3 player function or a multimedia player function, the storage unit 500 also stores at least one content data item.

The controller 600 controls the entire operation of the portable terminal. The controller 600 also controls the signal flows among the elements in the portable terminal. In an embodiment of the present invention, the controller 600 includes an application processor 610. The controller 600 further includes a main processor for controlling the entire operation of the portable terminal, for example, a mobile station modem (MSM) baseband chip.

The application processor 610 serves to execute the application in the portable terminal. The application processor 610 assists the main processor to process the amount of data computed in the main processor. The application processor 610 is installed separately from the main processor.

The application processor driving unit 620, connected to the controller 600, drives the application processor 610. It is preferable that the application processor driving unit 620 is directly connected to the application processor 610. The power consumption control apparatus according to the present invention corresponds to the application processor driving unit 620 which will be described, in detail, with reference to FIG. 2.

If the portable terminal is configured in such a way that the processor is implemented with a single chip, the application process 610 is included in the main processor. In that situation, the application processor driving unit 620 serves to drive the main processor.

Figure 2:
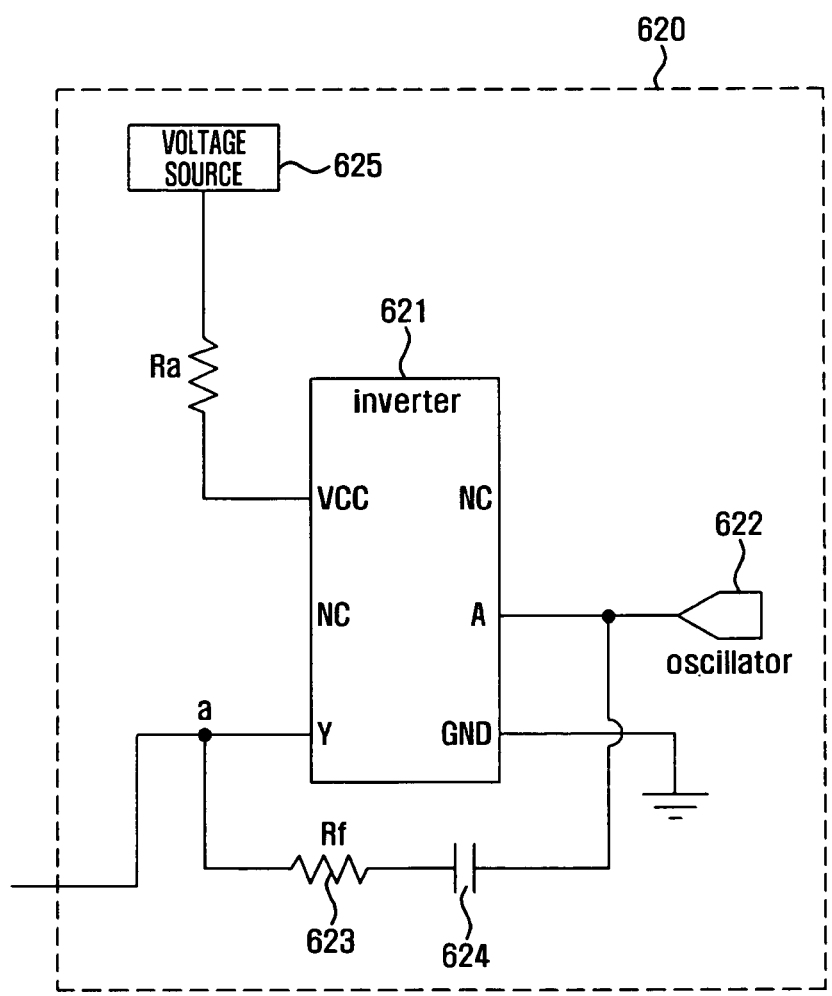
FIG. 2 illustrates the circuitry of an application processor driving unit according to an embodiment of the present invention.

FIG. 2 illustrates circuitry of an application processor driving unit according to an embodiment of the present invention.

As shown in FIG. 2, the application processor driving unit 620 includes an inverter 621, an oscillator 622, a feedback resistor (Rf) 623, a capacitor 624, and a voltage source 625.

The inverter 621 receives a signal from the oscillator 622 and outputs an inverting signal. The inverter 621 is implemented with a chip that includes a voltage source pin VCC, an input pin A, an output pin Y, and a ground pin GND. If the inverter 621 is implanted with a chip with six pins, for example, Fairchild's NC7SV04, it has further two no-connection (NC) pins. In an embodiment of the present invention, the inverter 621 is connected to the oscillator 622 via the input pin A and to the application processor 610 via the output pin Y. The inverter 621 receives the DC voltage from the voltage source 625, amplifies an AC signal that is output from the oscillator 622 using the biased DC voltage, and outputs an inverted, amplified AC signal via the output pin Y.

The oscillator 622 creates an AC signal by exchanging energy between electrical elements. The oscillator 622 serves to create electrical signals to control the sleep mode and an idle mode of the portable terminal.

In an embodiment of the present invention, the sleep mode refers to a mode in which the portable terminal consumes minimum power by enabling few functions and turning off other functions. The standby mode refers to a mode in which the portable terminal consumes an amount of power used to normally perform functions or the portable terminal performs control operations.

The portable terminal switches from a sleep mode to a standby mode, or vice versa, at a certain period. If the portable terminal does not search for a paging channel with information regarding an operation to be conducted in a standby mode, it switches from the standby mode to a sleep mode. Alternatively, if the portable terminal searches for a paging channel, it maintains the standby mode for a certain period of time. The period of switching between a sleep mode and a standby mode is referred to as a slot cycle. The slot cycle is determined by a slot cycle index designated to the portable terminal. If the slot cycle is 5.125 seconds, 5 seconds corresponds to the sleep mode and 0.125 second corresponds to the standby mode. If the user inputs key signals into the input unit 400 or opens the housing of the portable terminal with respect to the body of the portable terminal (e.g., a folder if the portable terminal is a folder-type or a sliding body if the portable terminal is a slide-type), the portable terminal switches from the sleep mode to the standby mode. In that situation, the display panel 300 is turned on in the standby mode and turned off in the sleep mode. The oscillator 622 generates signals to switch between the sleep mode and the standby mode. In an embodiment of the present invention, it is assumed that the portable terminal executes an MP3 player application and continues to output an audio sound irrespective of a sleep mode or a standby mode.

In an embodiment of the present invention, the oscillator 622 is implemented with a voltage controlled temperature compensated crystal oscillator (VCTCXO). In an embodiment, VCTCXO creates an AC signal with a resonant frequency of 19.2 MHz. The oscillator 622 is connected to the input pin A of the inverter 621 and outputs the AC signal to inverter 621 via the input pin A.

The feedback resistor (Rf) 623 controls the current flowing on the line between the input pin A and the output pin Y of the inverter 621. The feedback resistor (Rf) 623 enhances the stability of the portable terminal, reduces the external noise, and increases the amplification bandwidth. The feedback resistor (Rf) 623 is located between the input pin A and the output pin Y. In an embodiment of the present invention, the feedback resistor (Rf) 623 has a resistance of 100 KΩ. In a modification, the feedback resistor (Rf) 623 may be omitted if a capacitor is connected to the circuit of the inverter 621.

The capacitor 624 cuts the DC bias voltage that is applied to the feedback resistor (Rf) 623 from the oscillator 622. The capacitor 624 is located between the input pin A and the output pin Y and serially connected to the feedback resistor (Rf) 623. In an embodiment of the present invention, the capacitor 624 is located between the input pin A and the feedback resistor (Rf) 623 or between the output pin Y and the feedback resistor (Rf) 623. It is preferable that the capacitor 624 has a capacitance of 1 nF.

The voltage source 625 outputs a DC voltage to the voltage source pin VCC. The inverter 621 varies the amplitude of its output signal, according to the value of the DC voltage output from the voltage source 625. In an embodiment of the present invention, the voltage source 625 supplies 1.8 V DC to the inverter 621.

In addition, the application processor driving unit 620 may further include a resistor Ra for controlling voltage between the voltage source 625 and the inverter 621.

When the inverter 621 receives DC voltage from the voltage source 625 and an AC signal from the oscillator 622, it amplifies the received AC signal based on the DC voltage and outputs an inverted, amplified AC signal via the output pin Y. The inverted, amplified Ac signal is fed back to the input pin A via the feedback resistor (Rf) 623. In that situation, the DC bias voltage is derived on the feedback resistor (Rf) 623. The DC bias voltage is cut by the capacitor 624.

The application processor driving unit 620 varies the degree of cutting the DC bias voltage according to the location where the capacitor 624 is located. To test this, the application processor driving unit 620 is configured, as shown in FIG. 3, where the capacitor 624 is located at a position that differs from that as shown in FIG. 2, which is explained in detail with reference to FIG. 3.

Figure 3:
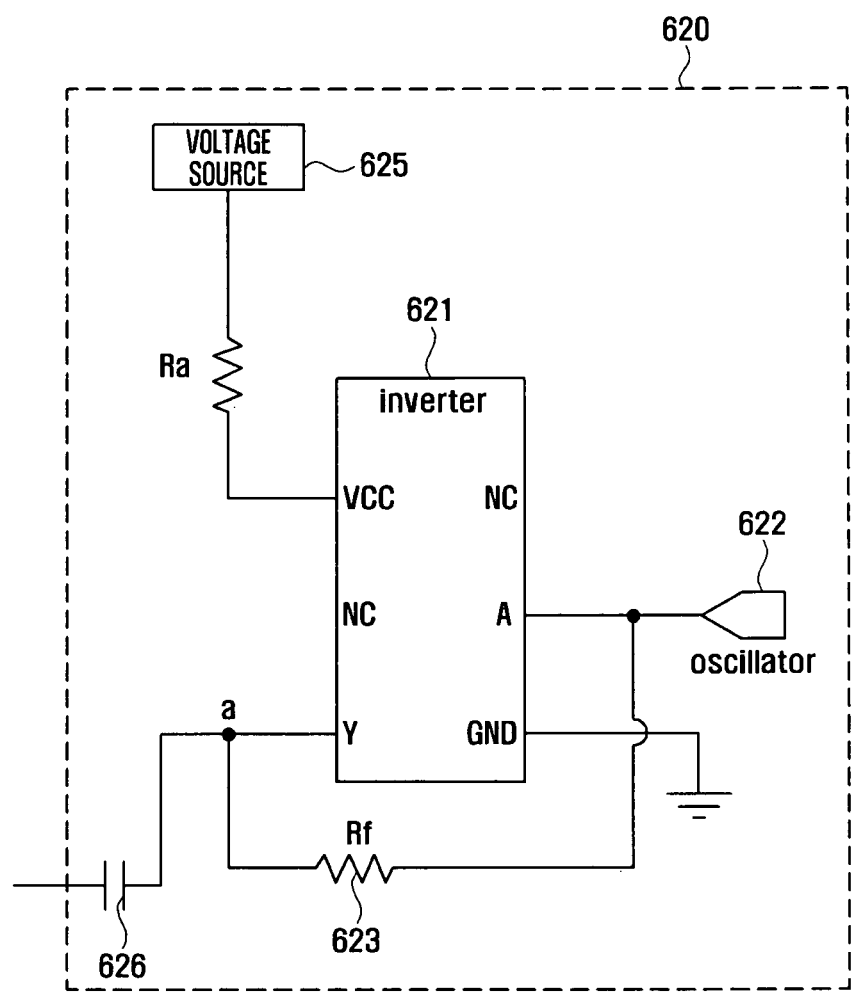
FIG. 3 illustrates the circuitry of an application processor driving unit according to an embodiment of the present invention.

FIG. 3 illustrates circuitry of an application processor driving unit 620 according to an embodiment of the present invention.

As shown in FIG. 3, the application processor driving unit 620 includes an inverter 621, an oscillator 622, a feedback resistor (Rf) 623, a capacitor 626, and a voltage source 625. The capacitor 626 is located at the output pin Y of the inverter 621 such that one end of the feedback resistor (Rf) 623 is connected to the node between the capacitor 626 and the output pin Y.

In order to compare the degree of cutting the DC bias voltage according to the location where the capacitor 624 is located, the waveforms at nodes A and B, as shown in FIGS. 2 and 3, are measured. The waveforms are shown in FIGS. 4A and 4B.

Figure 4A:
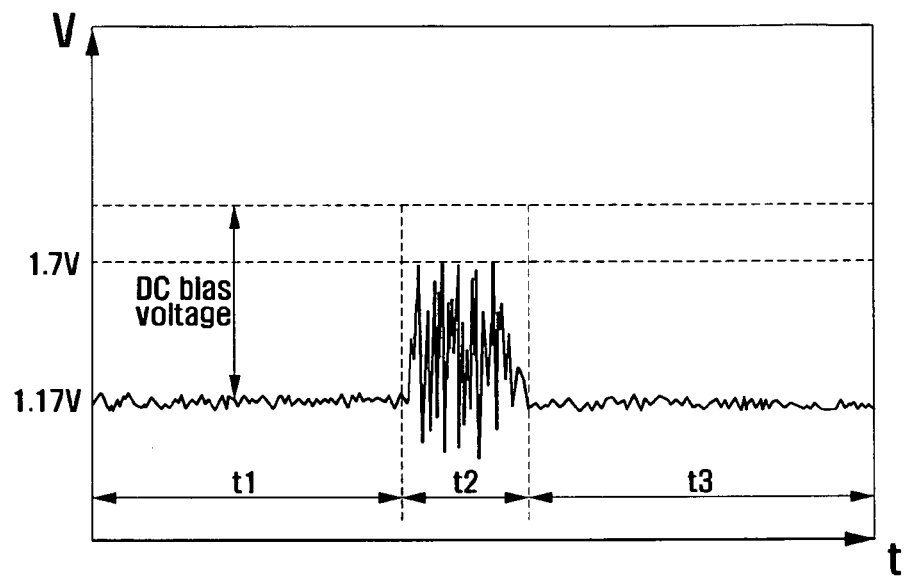
FIG. 4A illustrates an output waveform measured at node A of FIG. 2.
Figure 4B:
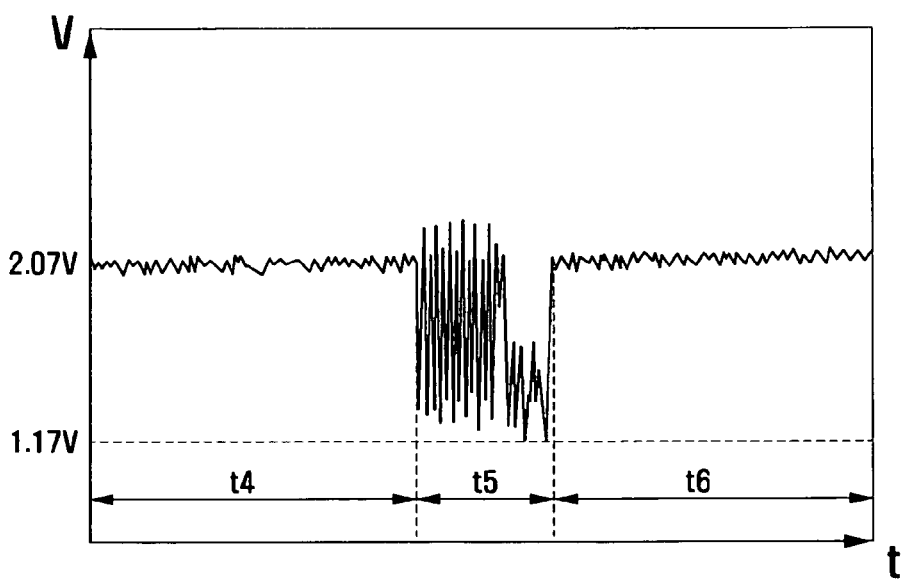
FIG. 4B illustrates an output waveform measured at node B of FIG. 3.

FIG. 4A illustrates an output waveform measured at node A of FIG. 2 and FIG. 4B illustrates an output waveform measured at node B of FIG. 3. FIGS. 4A and 4B assume that the voltage source 625 supplies 1.8 V DC to the inverter 621.

Referring to FIG. 4A, 't1' and 't3' refer to time intervals corresponding to the sleep mode of the portable terminal. Likewise, 't2' refers to a time interval corresponding to the standby mode of the portable terminal. As shown in FIG. 4A, the inverter 621 outputs approximately 1.17 V in the sleep mode and approximately 1.7 V in the standby mode, which are measured at node A. Since the capacitor 624 is serially connected to the feedback resistor (Rf) 623 and is located between the input pin A and the feedback resistor (Rf) 623, it can cut the DC bias voltage created at the feedback resistor (Rf) 623, such that the output voltage of the inverter 621 can be maintained low in the sleep mode. Although the embodiment of FIG. 4A is explained in such a way that the capacitor 624 is located between the input pin A and the feedback resistor (Rf) 623, it should be understood that the same result as the embodiment of FIG. 4A can also be acquired as the capacitor 624 is serially connected to the feedback resistor (Rf) 623 and is located between the output pin Y and the feedback resistor (Rf) 623.

Referring to FIG. 4B, 't4' and 't6' refer to time intervals corresponding to the sleep mode of the portable terminal. Likewise, 't5' refers to a time interval corresponding to the standby mode of the portable terminal. As shown in FIG. 4B, the inverter 621 outputs approximately 2.07 V in the sleep mode and approximately 1.17 V in the standby mode, which are measured at node B. This result shows that the DC bias voltage (0.9 V) is derived on the feedback resistor (Rf) 623 during the feedback and is not cut by the capacitor 626. Therefore, if the portable terminal uses the application processor driving unit 620 as configured in FIG. 3, the application processor driving unit 620 is outputting a relatively high voltage in a sleep mode that is maintained for a relatively long period of time, which increases the power consumption.

Accordingly, if the capacitor is located at the output pin Y of the inverter 621 as shown by capacitor 626 in FIG. 3, the DC bias voltage cannot be cut. In contrast, if the capacitor is serially connected to the feedback resistor (Rf) 623 and is located between the input pin A and the feedback resistor (Rf) 623 as shown by capacitor 624 in FIG. 2, it can cut the DC bias voltage created at the feedback resistor (Rf) 623.

As described above, the power consumption control method and apparatus, according to the present invention, can reduce the power consumption in the portable terminal, by cutting the DC bias voltage created at the feedback resistor, when the processors are driven or operated in a sleep mode.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A power consumption control apparatus of a portable terminal comprising:
    an oscillator configured to create alternating current (AC) signals to control the portable terminal to be operated in one of a sleep mode and a standby mode;
    an inverter configured to invert the AC signals received from the oscillator and output the inverted AC signals;
    a voltage source configured to output a direct current (DC) voltage to the inverter; and
    a direct current (DC) bias voltage cutting unit configured to receive the inverted AC signals and reduce the DC bias voltage by feeding the inverted AC signal from an output port of the inverter back to an input port of the inverter via a feedback line.

2. The apparatus of claim 1, wherein the DC bias voltage cutting unit comprises a capacitor.

3. The apparatus of claim 1, wherein the feedback line comprises a feedback resistor.

4. The apparatus of claim 3, wherein the DC bias voltage cutting unit is serially connected to the feedback resistor.

5. The apparatus of claim 3, wherein the DC bias voltage cutting unit is located between the input port of the inverter and the feedback resistor.

6. The apparatus of claim 3, wherein the DC bias voltage is derived on the feedback line as the inverted signal from the output port of the inverter is fed back to the input port of the inverter via the feedback resistor.

7. The apparatus of claim 1, wherein the inverter is further configured to amplify the signals received from the oscillator based on the DC voltage from the voltage source.

8. The apparatus of claim 1, wherein the oscillator comprises a voltage controlled temperature compensated crystal oscillator.

9. The apparatus of claim 1, wherein:
    the portable terminal consumes a minimum amount of power by enabling a minimum number of functions in the sleep mode, and
    the portable terminal consumes power used to perform normal functions in the standby mode.

10. The apparatus of claim 1, wherein the DC bias voltage is derived on the feedback line between the output port and the input port of the inverter.

11. A power consumption control method of a portable terminal comprising:
    creating alternating current (AC) signals to control the portable terminal to be operated in one of a sleep mode and a standby mode;
    receiving a direct current (DC) voltage from a voltage source;
    inverting the AC signals and outputting the inverted AC signals;
    feeding the inverted AC signals from an output port of an inverter back to an input port of the inverter via a feedback line; and
    reducing a DC bias voltage as a result of the feeding.

12. The method of claim 11, wherein the DC bias voltage is cut using a capacitor.

13. The method of claim 12, wherein the feedback line comprises a feedback resistor.

14. The method of claim 13, wherein the capacitor is serially connected to the feedback resistor.

15. The method of claim 13, wherein the capacitor is located between the input port of the inverter and the feedback resistor.

16. The method of claim 11, further comprising providing a DC voltage to the inverter.

17. The method of claim 16, further comprising amplifying the AC signals received from an oscillator based on the DC voltage from the voltage source.

18. The method of claim 17, wherein the oscillator comprises a voltage controlled temperature compensated crystal oscillator.

19. The method of claim 11, wherein the portable terminal switches between the sleep mode and the standby mode at a predetermined period.

20. The method of claim 11, wherein:
    a minimum number of functions are enabled to minimize power consumption in the sleep mode, and
    normal functions are performed in the standby mode.

21. The method of claim 11, wherein the DC bias voltage is derived on the feedback line between the output port and the input port of the inverter.

* * * * *